(12) United States Patent
Santina (10) Patent No.: US 9,878,922 B1
(45) Date of Patent: *Jan. 30, 2018

(54) REMOVAL OF CONTAMINANTS FROM WATER

(71) Applicant: Peter F. Santina, Lincoln, CA (US)

(72) Inventor: Peter F. Santina, Lincoln, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/210,754

(22) Filed: Jul. 14, 2016

Related U.S. Application Data (63) Continuation of application No. 15/058,090, filed on Mar. 1, 2016, now Pat. No. 9,427,706, which is a
(Continued)

(51) Int. Cl.
| | |
|---|---|
| *C02F 1/28* | (2006.01) |
| *C02F 1/00* | (2006.01) |
| *C02F 1/66* | (2006.01) |
| *C02F 1/74* | (2006.01) |
| *C02F 1/52* | (2006.01) |
| *C02F 9/00* | (2006.01) |

(Continued)

(52) U.S. Cl.
CPC .............. *C02F 1/281* (2013.01); *C02F 1/001* (2013.01); *C02F 1/283* (2013.01); *C02F 1/50* (2013.01); *C02F 1/5245* (2013.01); *C02F 1/5281* (2013.01); *C02F 1/66* (2013.01); *C02F 1/74* (2013.01); *C02F 9/00* (2013.01); *C02F 2101/106* (2013.01); *C02F 2103/001* (2013.01); *C02F 2103/10* (2013.01); *C02F 2209/06* (2013.01); *C02F 2303/20* (2013.01)

(58) Field of Classification Search
None
See application file for complete search history.

(56) References Cited

U.S. PATENT DOCUMENTS

| | | |
|---|---|---|
| 4,519,913 A | 5/1985 | Baldwin et al. |
| 4,938,874 A | 7/1990 | Auchincloss |

(Continued)

FOREIGN PATENT DOCUMENTS

WO      WO9519320 A1      7/1995

OTHER PUBLICATIONS

Nordic Water, "Dynasand", print of website nordicwater.com, pre-2013, three pages, Nordic Water Products AB.
(Continued)

*Primary Examiner* — Chester T Barry
(74) *Attorney, Agent, or Firm* — Thomas M. Freiburger (57) ABSTRACT

Overburden from surface coal mining in many regions can produce a rain runoff laden with selenium, in the selenate form. This occurs from rainwater leaching through exposed selenium-containing rocks in the overburden. The selenium-containing runoff water is caught in ponds. Remediation of the pond water to remove selenate is performed by treatment with sulfur-modified iron (SMI) in a contact bed of an upflow reactor vessel. The pond water after pretreatment is pumped through the SMI reactor, and can then be run through an oxidation tank and filtered to remove iron. For extending effectiveness and life of the SMI the contact bed is either periodically "fluffed" with a high-velocity upflow of water through the bed, or moved continuously through the column in a continuous medium filtration system. A biocide can be added to runoff water prior to the contact bed.

12 Claims, 6 Drawing Sheets

Related U.S. Application Data continuation-in-part of application No. 14/170,472, filed on Jan. 31, 2014, now Pat. No. 9,272,934, which is a continuation-in-part of application No. 13/555,620, filed on Jul. 23, 2012, now abandoned.

(60) Provisional application No. 61/759,039, filed on Jan. 31, 2013.

(51) Int. Cl.
*C02F 1/50* (2006.01)
*C02F 101/10* (2006.01)
*C02F 103/10* (2006.01)
*C02F 103/00* (2006.01)

(56) References Cited

U.S. PATENT DOCUMENTS

| | | |
|---|---|---|
| 4,940,549 A | 7/1990 | Olsen et al. |
| 5,200,082 A | 4/1993 | Olsen et al. |
| 5,575,919 A | 11/1996 | Santina |
| 5,866,014 A | 2/1999 | Santina |
| 6,093,328 A | 7/2000 | Santina |
| 6,197,201 B1 | 3/2001 | Misra et al. |
| 6,926,878 B2 | 8/2005 | Santina |
| 7,892,436 B2 | 2/2011 | Gadgil |
| 9,272,934 B2 | 3/2016 | Santina |
| 9,427,706 B1 | 8/2016 | Santina |
| 2011/0132839 A1 | 6/2011 | Zuback et al. |

OTHER PUBLICATIONS

Parkson, "DynaSand EcoWash", print of website parkson.com, pre-2013, three pages, Parkson Corporation.

REMOVAL OF CONTAMINANTS FROM WATER

This application is a continuation of application Ser. No. 15/058,090 filed Mar. 1, 2016, now U.S. Pat. No. 9,427,706, which was a continuation-in-part of application Ser. No. 14/170,472, filed Jan. 31, 2014, which was a continuation-in-part of application Ser. No. 13/555,620, filed Jul. 23, 2012, and claimed benefit of provisional application Ser. No. 61/759,039, filed Jan. 31, 2013.

BACKGROUND OF THE INVENTION

This invention concerns remediation of surface waters by removal of toxic metals prior to discharge of the waters to streams and lakes. In particular the invention concerns overburden from surface coal mining in certain regions where selenium-containing rock is present in the overburden, and where rainwater leaching through the rock introduces objectionable levels of selenium into the runoff water, typically in the form of selenate, these levels being too high for discharge to streams and lakes.

The subject of this invention is related to that of U.S. Pat. Nos. 4,940,549, 5,200,082, 5,575,919, 5,866,014, 6,093,328 and 6,926,878. In particular, the latter four patents, U.S. Pat. Nos. 5,575,919, 5,866,014, 6,093,328 and 6,926,878 disclose preparation of a sulfur-modified iron premix (SMI) for use in treating water to remove certain substances. This invention utilizes a sulfur-modified iron (SMI) premix similar to that produced in accordance with the above patents, in a reaction column to treat runoff water laden with selenium, in particular, selenate. All of the above patents are incorporated herein by reference.

Surface coal mining operations produce large volumes of overburden, which is removed to reach coal seams. In the United States the overburden must ultimately be replaced when the mining operation is completed or moves on, and the land is reclaimed essentially back to its original condition and topography. However, the overburden exposes a multitude of rocks to rainfall, i.e. to moving water which can leach the rocks and take on substances, including minerals, present in the rocks. Rainwater is nearly pure and is a strong leaching agent. These rocks if left undisturbed would be subject to little or no rainwater leaching. The result is that runoff from rain can carry objectionable levels of dissolved substances, leached from the exposed rock, into lakes and streams.

Particularly in the Appalachian region of the United States many surface coal mining locations have rock and soil ("rock" herein) that contains selenium, especially in the selenate form. The removal of the overburden exposes these rocks and even after reclamation, runoff from rainwater in many cases exceeds permissible levels of selenium allowed for discharge to lakes and streams. In many cases the runoff water, or much of it, has been trapped in detention "ponds" at various locations around the site of a surface mine, including after reclamation, pursuant to regulations that prohibit sediment-laden runoff water from being discharged to lakes and streams at excavation sites. However, eventually the pond water must be withdrawn or allowed to overflow, ultimately reaching lakes or streams. Although sediment is much less, dissolved minerals remain, including selenium. There has been no economically feasible method for remediation of this selenium problem, and it affects many surface mines, particular in the Appalachian region, as well as others.

SUMMARY OF THE INVENTION

In the process of the invention, the selenium-containing runoff water at a surface coal mining site is caught in detention ponds. Remediation of the pond water to remove selenate down to permissible levels for discharge to lakes and streams is performed by treatment with sulfur-modified iron (SMI) in an upflow reactor vessel. After a prefiltering step to remove suspended and colloidal solids, the pond water is pH-adjusted as needed and pumped through the SMI reactor in upward flow, for a specified detention time in the SMI. The treated water, low in selenium, can then be run through an oxidation tank and filtered to remove dissolved iron that is a residual from the SMI process. The process is run in continuous flow.

The system includes provision for "fluffing" the SMI medium periodically, to expand the bed of SMI with a rapid flow of water through the medium. Not a backflush, this fluffing opens up the spaces between SMI particles, reversing compacting that has occurred, and refreshes the active surfaces to extend the life of the bed. This can be done once or more per day, for about ten to twenty minutes, at about ten times normal (service) flow rate. Fluff flow is in the same upflow direction as normal service flow. This fluffing cycle is useful in any SMI reactor column removing metals or other substances from water, not limited to coal mine runoff.

In a second embodiment of the invention, the process is the same as described above except that powdered iron is used instead of SMI. The powdered iron is a finely divided elemental iron (zero-valent), with particle size preferably about 40-80 mesh (0.017 inch to 0.007 inch). Powdered iron will react with selenium, i.e. will adsorb selenium, but not as efficiently as will SMI. In the reactor system and process of the invention, the other steps of collecting runoff in a pond, prefiltering, adjustment of pH where necessary, and passing the water through an upflow reactor, followed by steps to remove iron oxide, and periodic fluffing of the contact bed medium, are the same as described above.

It is an object of the invention to provide a process and system which effectively and efficiently remove selenium from runoff water at a coal mining site, during mine operation and after mine site reclamation. These and other objects, advantages and features of the invention will be apparent from the following description of a preferred embodiment, considered along with the accompanying drawings.

DESCRIPTION OF PREFERRED EMBODIMENTS

Permits for surface mine operators in the U.S. require that the rainfall runoff drainage from the surface mine site be controlled so that no runoff sediment is carried down into creeks, streams or lakes. The rainwater runoff flowing into these ponds has aggressively pulled dissolved minerals out of rocks, minerals such as sulfates (e.g. sodium sulfate and magnesium sulfate) and selenium, typically in the selenate form, these minerals being highly soluble. The runoff ponds tend to concentrate the dissolved minerals even further due to evaporation from the ponds. The selenate is difficult to remove from an aqueous solution.

Figure 1:
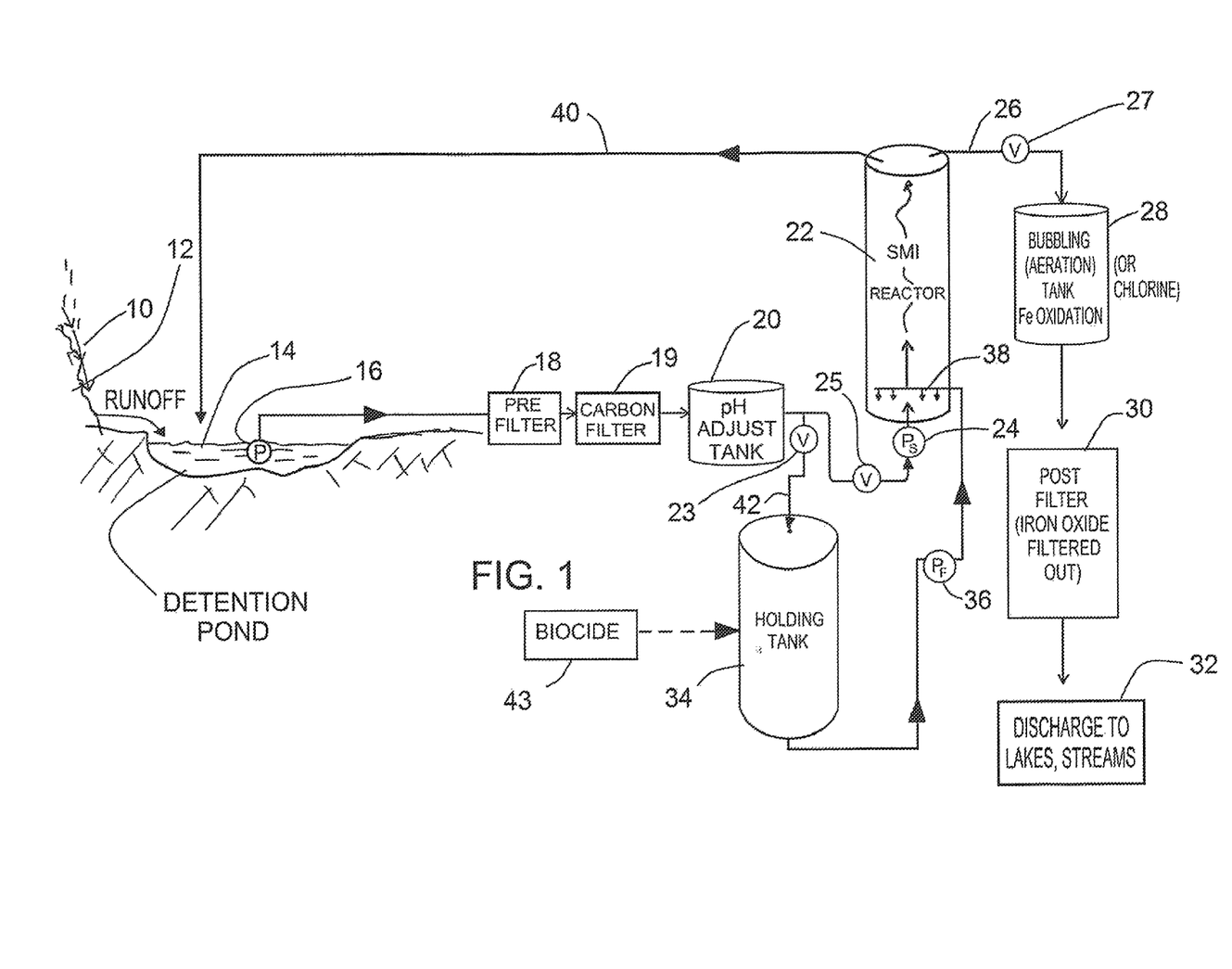
FIG. 1 is a schematic view indicating steps of the invention, including collecting runoff from surface mining coal overburden in a pond, withdrawing the pond water and processing the water through the steps of the invention.

FIG. 1 schematically shows important aspects of the invention. Runoff water emanating from rainfall is indicated at 10, flowing over and through the overburden 12 from a surface coal mining operation, sometimes called strip mining. This overburden is replaced after completion of mining at a particular location, and although the land is reclaimed, and the topography essentially restored using the overburden soil and rocks, this material has nonetheless been disturbed, and runoff rainwater, essentially pure and without dissolved minerals, will actively leach out some of the minerals from the rocks of the overburden. This occurs both during mining and after reclamation.

As noted above, one particularly deleterious mineral typically leached from rocks in certain geographical areas is selenium, usually in the form of selenate. Examples are sodium selenate, calcium selenate and magnesium selenate. The selenate ion is $SeO_4^{2-}$.

Although selenium is a mineral needed in the diet of humans in very small quantities, it has toxic effects to aquatic life at higher concentrations. Certain standards for discharge of runoff water from disturbed or reclaimed land place a limit of five parts per billion (ppb) selenium content for water that will be allowed to flow into streams and lakes. This is imposed whenever human activity is responsible for concentrating the level of selenium. In contrast, runoff water which concentrates in runoff-catching ponds at a surface mining coal site can have twenty to thirty parts per billion selenium and occasionally more.

FIG. 1 indicates one such runoff-catching pond, at 14. By the process and system of the invention, the runoff pond water 14 is remediated to remove much of the selenium content, down to below the limit of 5 ppb. As indicated, the runoff water is pumped by a pump 16 from the pond (preferably a submerged pump suspended just below the surface), and prefiltered at 18 to remove suspended and colloidal solids. This can be, e.g., a sand filter. Following this filtration the water optionally can be put through a carbon filter as indicated at 19 to remove any additional colloidal matter and any color left in the water.

The acidity of the filtered water is checked (and preferably is constantly monitored) at a tank 20, and if needed, pH is adjusted in this tank, which can be on a continuous-flow basis. An automatic system that monitors pH of the pond water and automatically adds acid for pH correction may be included in the tank or chamber 20. The preferred range of pH for treatment in the invented process is below pH 7, and preferably in the range of about 5.0 to about 7.0, more preferably about 5.5 to about 6.5, most preferably about 6.0 to about 6.5. At a pH greater than about 8, calcium can be precipitated during the treatment, which has a negative effect on treatment. In one preferred embodiment the acidity of the water exiting the adjustment tank or zone 20 is about pH 6. This usually requires addition of acid (sulfuric acid in a preferred embodiment) in the tank or zone 20, since the runoff water at a location such as the Appalachian Mountains is typically in the range of about pH 7 to 7.5. Since the chemical reactions taking place in the SMI reactor tend to increase the pH to above 8.0, the acid addition is required to avoid impairing the life of the SMI.

The prefiltered runoff water, at a pH in the desired range, proceeds to a reactor column 22, which may involve another pump (after flow through a valve 25, the purpose of which will be explained below). The column 22 comprises a vertical reactor vessel through which the water is pumped to flow preferably from bottom to top as indicated; upflow assures proper and even contact with the reactant and helps keep the mass of reactant particles "open" rather than compacted. The vessel is filled with sulfur-modified iron or SMI as noted above, the SMI being chemically reactive to remove selenate and some other materials from water by adsorption, as discussed in the patents cited above, incorporated herein by reference. The depth of SMI in the reactor vessel should be limited, preferably no more than about six feet high (and preferably lower), to avoid compaction of the SMI particles. Openness is needed for best contact and treatment. In a reactor column having a diameter of about 2.0 feet and a SMI bed depth of about 40 inches, the water will take about eight minutes to flow through the SMI bed (and additional time to exit at the top of the vessel). This is a preferred dwell time for contact with the SMI, or preferably a range of about 5 to 15 minutes. The water flows out through a line 26 and a valve 27, explained below.

In a practical installation, a reactor vessel should have an inside diameter in a range of about 3 to 6 feet.

In the effluent of the reactor, indicated at the top of the reactor at 26, the treated water is low in selenium, below permissible limits, and will contain some calcium, magnesium and other minerals that may be picked up via leaching, but the water also carries some additional dissolved iron taken on from the SMI.

Iron can be removed from the treated effluent using oxidation and filtration. For example, in a tank 28, the treated water can be subjected to bubbling aeration to oxidize iron in the water, creating an iron oxide precipitate. Oxidation can also be effected by chlorination in a tank such as shown at 28. FIG. 1 shows a post-filtration step 30, in which iron oxide precipitate is filtered out of the treated water, which can be with another sand filter or another type of filter. The iron content is reduced preferably to below 0.5 parts per million. As indicated in the drawing at 32, the treated water after the sand filter can then be discharged to lakes or streams.

The entire process of the invention can be, and preferably is, carried out at atmospheric pressure (disregarding slight hydraulic pressure from pumping and in the reactor column).

As mentioned above, periodically the reactor column, i.e. the contact bed within the reactor 22, is subjected to "fluffing" to loosen and open the bed to prevent or break up compacting that has occurred, to extend the life of the medium. In FIG. 1 a separate flow circuit or fluff loop is indicated for this purpose, with the valve 23, a line 42, a holding tank 34, a fluff pump 36, fluff nozzles 38 in the tank 22, and a fluff return line 40. Fluffing of the reactor contact bed is performed preferably at least once daily, for about ten to twenty minutes. For a fluff cycle the tank 34 is pre-filled. The valve 23, which receives the prefiltered, pH-adjusted pond water, is opened to allow water to flow through the line 42 to the holding tank, which is vented to allow filling. Note that the line 42 could come from farther upstream, but preferably is as shown, so that filtered water at desired acidity is used for fluffing the SMI. When a fluff cycle is begun the pump 24 and the valves 25 and 27 are shut off and the fluff pump 36 is activated, drawing water out of the already-filled holding tank 34 and delivering the water at high velocity, approximately ten times or more service flow rate, through the fluff nozzles 38 in the tank. This rapid flow, preferably directed downwardly as it exits the nozzles 38, stirs up, fluffs, expands and fluidizes the SMI reactor bed, normally expanding the bed to twice its normal volume in the tank. With the service flow exit valve 27 closed, fluff water exits the tank at 40 and can be returned to the pond water 14. This water could be directed in a different way if desired, such as to the holding tank 34, although the water, still with high selenium, would also carry an elevated iron content from contact with the medium and thus return of the water to the runoff pond is generally preferable.

During the fluff cycle the valve 23 can remain open, slowly admitting water into the holding tank 34 while this tank is essentially drained by the fluff pump 36. The holding tank provides storage for the surge of fluff water flow that occurs during the fluff cycle. Note that the tank 34 is vented.

At the end of a fluff cycle, the valve 27 is opened, the valve 25 is opened to deliver service water flow via the pump 24, which is reactivated, and the fluff pump 36 is shut off. However, the holding tank 34 must be refilled, which can be done simultaneously with normal service flow through the reactor, and the valve 23 remains open (or is reopened if it has been closed during fluff). FIG. 1 is a simplified view, and in many instances there will be a plurality of reactors 22, e.g. ten or more, operating in parallel. The valve 25 is a schematic indication, and typically the pump 24 will provide service flow to a series of reactor vessels, e.g. ten or more, or each vessel can have its own service pump. The fluff flow is a much higher rate of flow, thus the need for the holding tank 34. The tank 34 can be open at top or otherwise vented so that it can be essentially drained during fluff. It can then be refilled at a slower rate, from the water flow downstream of the pH adjustment tank. Normally one reactor tank 22 is fluffed at a time.

As indicated in FIG. 1 at 43, a biocide may be added to the water in the holding tank 34, or into the line leading to the fluff nozzles 38, to introduce the biocide into the fluffing or fluidizing water. This can be important because the standing water in the runoff pond 14 tends to pick up a biofilm that can grow on and reduce effectiveness of the SMI. Even if the fluffing were not included in the system, the biocide could be introduced continually in an inflow conduit such as the line leading to the fluff nozzles. Glutaraldehyde and DBNPA can be particularly effective biocides. The addition of biodispersants can also help penetrate biofilms. DBNPA or 2,2-dibromo-3-nitrilopropionamide is a quick-kill biocide. Glutaraldehyde is an organic compound with the formula $CH_2(CH_2CHO)_2$. A pungent colorless oily liquid, glutarldehyde is used to sterilize medical and dental equipment.

Both chemical biocides have been used and found effective to reduce the metabolic process of the biofilm that can grow on sulfur modified iron (SMI). Either can be added into the water that is used to fluff or fluidize the SMI bed. An effective concentration is about 10 to 30 mg per liter of fluff water, added by batch to the holding tank or continuously into a pipe leading to the treatment column. The compounds break down into harmless elements and can be discharged with the stream that has been treated.

Figures 3, 3A:
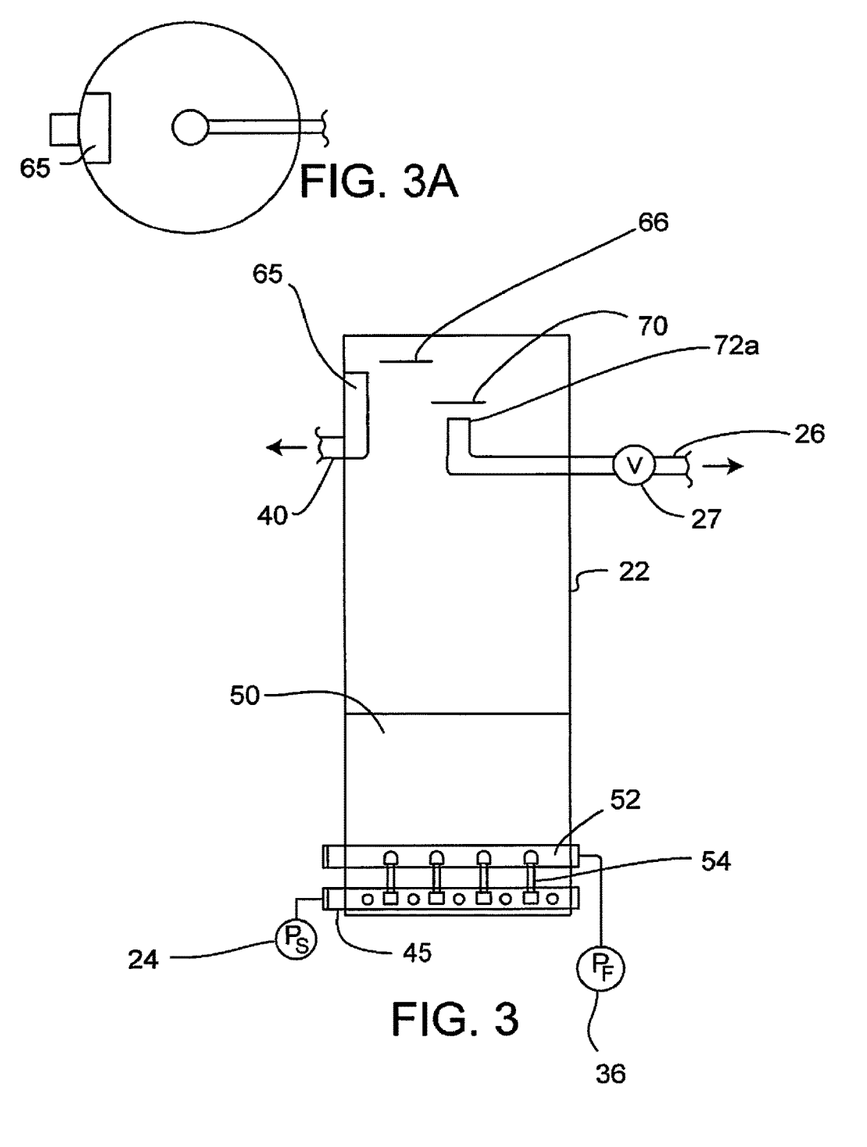
FIG. 3 is a more detailed schematic elevation view of the reactor vessel of the system.
FIG. 3A is a schematic plan view showing elements of the reactor vessel.
Figure 4:
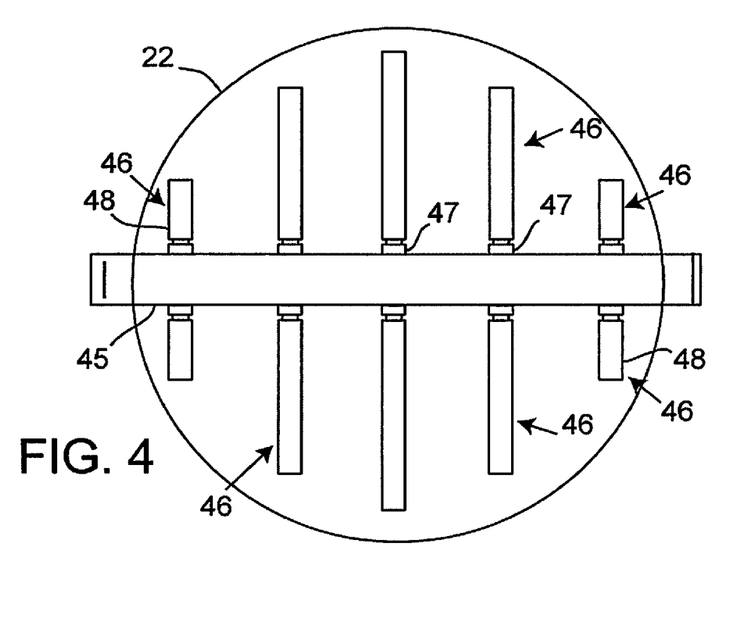
FIG. 4 is a plan view showing a layout of service flow diffusers in the reactor vessel.

The reactor 22 is shown in greater detail in FIGS. 3 and 3A, where the schematic views essentially show the reactor vessel in cross section, both elevation and top plan. FIG. 3 shows the service pump 24, also designed as $P_s$, directing the prefiltered and pH-adjusted pond water into the bottom of the tank via a header or manifold pipe 45 at the tank bottom. The header 45, preferably a stainless steel pipe of about 4 inch diameter, is shown in FIG. 4 as feeding a series of diffuser tubes 46 of various lengths in accordance with the circular shape of the reactor as indicated at 22. Couplings 47 secure the tubes 46 to the header. These diffusers evenly disperse the pond water around the area of the reactor. The diffuser tubes preferably are stainless steel pipe, e.g. ¾ inch 316 stainless steel pipe, although they could be epoxy coated carbon steel. These pipes are plugged at the ends and have diffuser holes, which may be about ⅛ inch diameter, essentially equally spaced on the diffuser pipes and numbering about 68 (about 60 to 75) in a reactor tank having an outside diameter of 44 inches, inside diameter slightly less (about 43 inches). A range of diameter for practical purposes is about 3 feet to 6 feet. These pipes preferably are each encapsulated with a cylindrical screen 48 as indicated in FIG. 4. The screens help diffuse the pond water more evenly within the tank, and they prevent the reactor medium from clogging the delivery holes of the pipe. The screens are advantageously made of wedge wire, triangular in cross section, with slots facing inwardly toward the diffuser pipe. The screen slots may be about 0.005 inch wide, with the diffuser screen cylinder being approximately 2⅜ inch O.D. For example, these stainless steel screens may be made of wedge wire such as made by Johnson Screens (johnsonscreens.com) and often used in water wells. The screens have their slits facing inwardly.

FIG. 3 indicates the reactor medium 50 in the tank 22, the medium extending through less than half the height of the tank, and typically only about ⅓ the height of the tank. Also shown in FIG. 3 is the fluff pump 36, feeding high-velocity fluff water to the tank via a header 52 spaced above the service header 45. As explained above, the fluff pump 36 is active when the service pump 24 is inactive, and vice versa. The fluff header 52 is spaced a short distance above the header 45, e.g. about 4 inches, with short drop pipes 54 that extend down to deliver fluff water at approximately the same level as the service delivery pipes, i.e. as close to the bottom of the reactor vessel as practicable.

Figure 6:
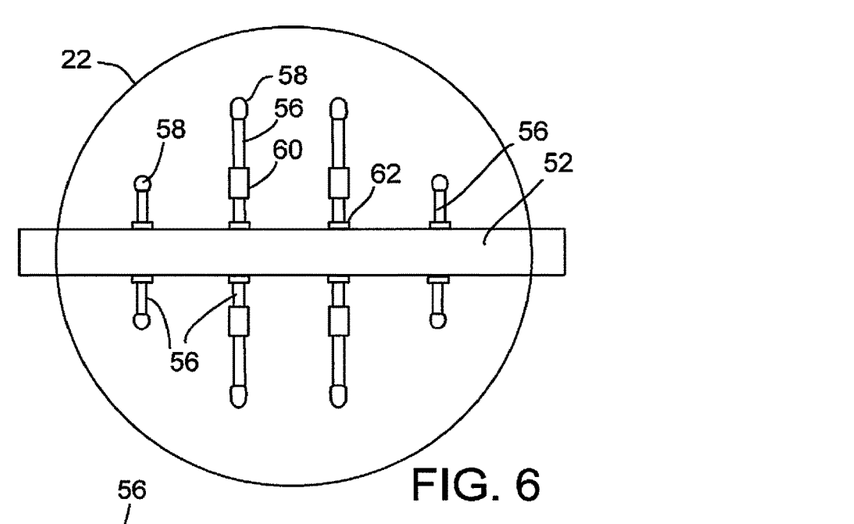
FIG. 6 is a plan view showing a layout of fluff flow nozzles.

FIG. 6 shows one preferred layout for the fluff water delivery system. The fluff header 52 can be a 4 inch pipe, to which are secured a series of laterals 56, with lengths that vary in accordance with the circular layout, as shown. There may be fewer of these than in the case of the service flow diffusers, as well as fewer and larger exit orifices, for delivery of the fluff flow which is approximately ten times or more the volumetric flow rate of the service flow.

Figure 5:
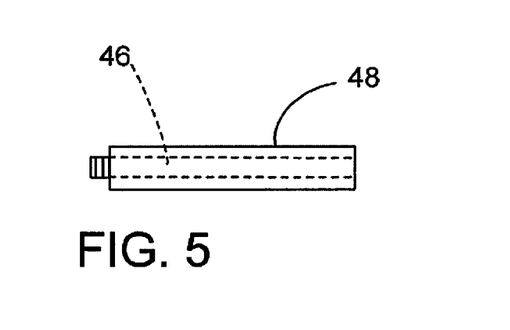
FIG. 5 is a detail view of a service flow diffuser.
Figure 7:
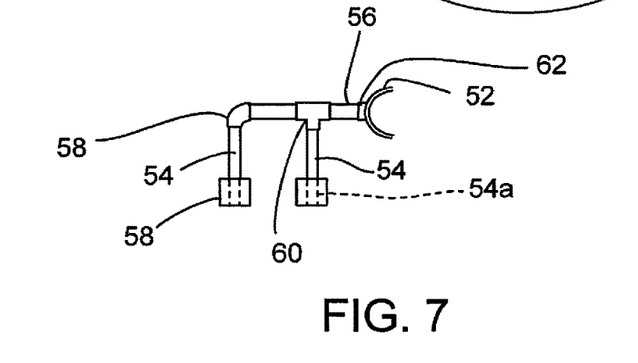
FIG. 7 is a detail view showing fluff nozzles.

As shown in FIGS. 6 and 7, the 4 inch header pipe 52 delivers the fluff flow via the laterals 56 down through the drop pipes 54 to fluff nozzles which, like the service nozzles, preferably are enclosed within cylindrical wedge wire screens 58. The drop pipe ends 54a enclosed within the screen preferably comprise, on each drop pipe, about four holes of about ⅜ inch diameter. Thus, in the layout shown in FIGS. 5 and 6 there are preferably about 48 holes. In a preferred embodiment the laterals 56 are 1½ inch pipe (preferably stainless steel), with the drop pipes preferably 1 inch pipe. Ells 58 and tees 60 are shown connecting the drop pipes to the lateral pipes 56, and these also are preferably stainless steel. Couplings are shown at 62 connecting the laterals to the 4 inch header pipe 52, also preferably of stainless steel. The couplings are welded onto the header.

The drop pipes 54 are of a length to place the high-flow fluff exit nozzles near the bottom of the reactor tank, and this may be in essentially the same level as the service flow diffusers as described above.

The headers 52 and 45 in one preferred embodiment extend through the walls of the reactor tank 22 as indicated in the drawings, and are welded to the walls in sealed relationship.

As noted above, the contact bed 50 of SMI medium is expanded greatly during the fluffing cycle, such that it occupies usually twice or more its normal volume in the tank. During the fluff cycle the fluffing water exits the tank via an overflow weir 65. Water level during fluff is indicated at 66 in FIG. 3, higher than service flow level. The water exits through a pipe 40, preferably a 6 inch pipe, which is the exit line schematically shown in FIG. 2, and this may return the fluff water to the detention pond.

In normal, service flow, the water level will be approximately at the indicated level 70 in FIG. 3, with the water exiting through a pipe 72, which can be a 3 inch pipe. This feeds the exit line 26 indicated in FIGS. 1 and 2, with the valve 27 in this line to be shut off during a fluff cycle. The pipe 72 has an input end 72a at a level high enough in the tank that the medium will not reach this level during a fluff cycle.

Chemical Reactions

As noted above, the SMI acts by adsorption. What appears to happen is that the selenate ion is pulled apart. The selenium of the selenate ion is believed to combine partly with the sulfur and partly with the iron and iron oxide (and possibly iron hydroxide) of the SMI; both selenium-sulfur and selenium-iron compounds exist in nature, usually together with other mineral elements and oxides. In fact, powdered iron alone has been used in the prior art to remove selenium, but as compared to the process with SMI, the use of powdered iron requires about ten to one hundred times more iron than does the SMI process. Also, many times more iron becomes dissolved in the treated water with the use of powdered iron rather than SMI.

The SMI in a reactor vessel is expected to remain active and effective for one year or more, when the reactor is operated at about 4-5 gallons per minute per square foot SMI. When the SMI has lost most of its effectiveness, it is replaced and the spent SMI can be melted down to retrieve the iron for re-use. Selenium content is minimal and can be discharged to a stack house filter on the stack of the steel mill.

EXAMPLE 1

An Example of the Actual Operation of a Small Scale Reactor

Adjacent to a sediment pond below a remediated surface mine slope in southern West Virginia.

A small scale SMI reactor was operated. It consisted of an 8 inch diameter 10 foot high steel pipe with a flanged bottom and an open top. A 6 inch long, 1½ inch diameter wedge wire pipe was placed inside the pipe at the bottom of the reactor perpendicular to the pipe wall to act as a diffuser for the influent pond water. Sulfur modified iron (SMI) was put into the pipe to a depth of 40 inches and water passed upflow through the SMI bed at a rate of 0.6 gallons per minute. The time of contact of water with the bed was approximately 14 minutes and the flow flux was about 2 gallons per minute per square foot.

The influent water was adjusted in a separate tank with sulfuric acid to reduce the inlet pH from 7.4 to a pH of 6.0 as the water entered the reactor. The effluent pH from the reactor tank was pH 7.6.

The selenate concentration in the pond was approximately 30 parts per billion and the selenate remaining in the water exiting the reactor was 0.05 parts per billion. There was no iron detected in the influent water and the iron concentration in the water at the outlet of the reactor was 39 parts per million (which in practice would be reduced to below 0.5 parts per million, as above).

The pilot was operated for approximately 30 days and at no time did the effluent water concentration of selenate from the reactor exceed 1 part per billion.

Figure 2:
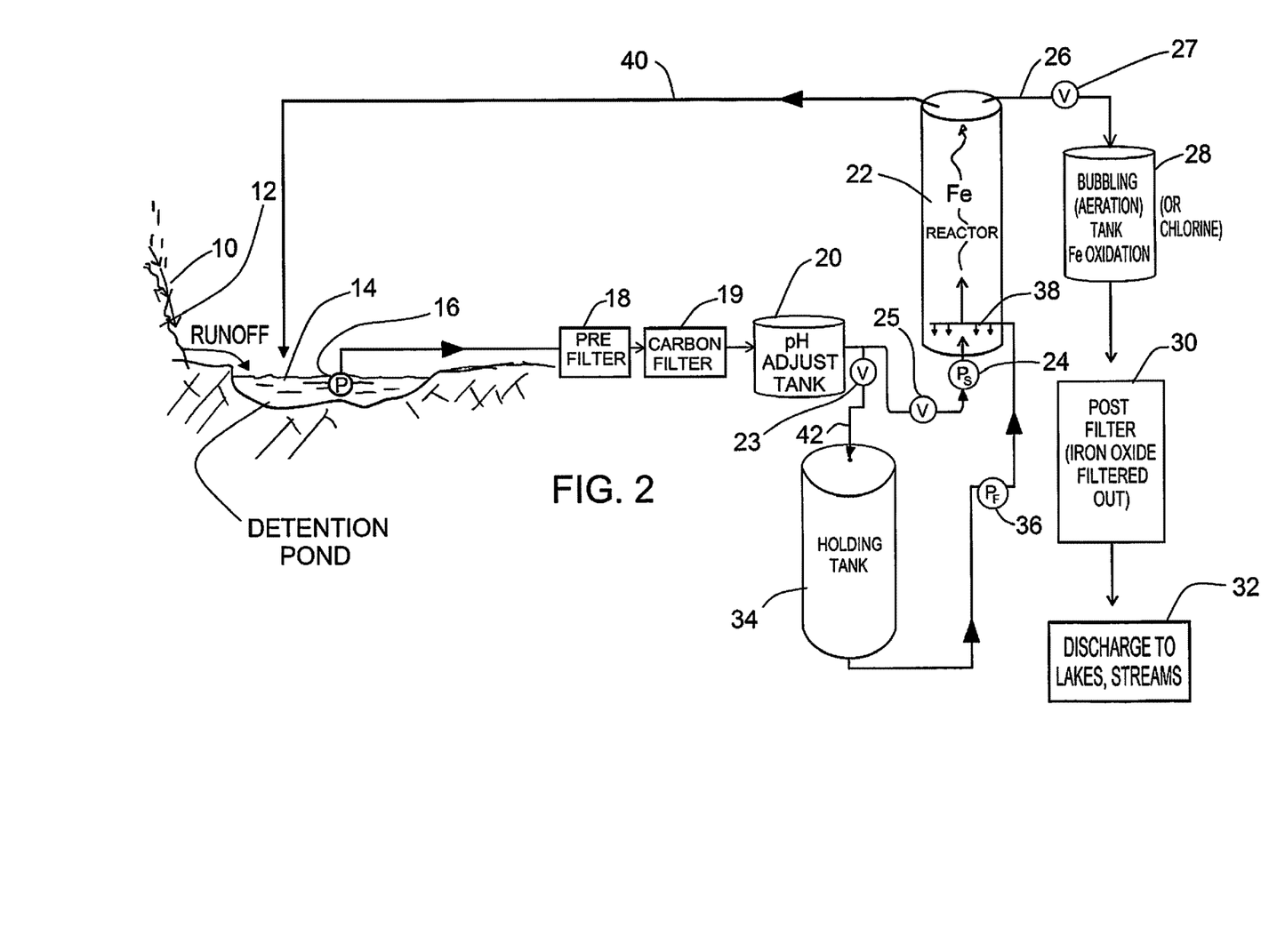
FIG. 2 is a similar view but showing a modified process.

In a second implementation of the invention, powdered iron is used rather than SMI, in essentially the same process. As noted above, powdered iron has been used previously to remove selenium, but not in the processes outlined above. FIG. 2 shows the modified process, with powdered iron used in the reactor rather than SMI. The other steps are similar, including the steps to remove iron oxide from the water post-reaction, and also including the fluff cycle for periodically loosening and extending the life of the contact bed.

In the iron reaction, as noted above, greater quantities of iron are consumed. The retention time in the reactor will be different, somewhat longer, estimated from 5 minutes to 30 minutes. Flow rate will be slower, in a range of about 1-5 gallons per minute per square foot.

Figure 8:
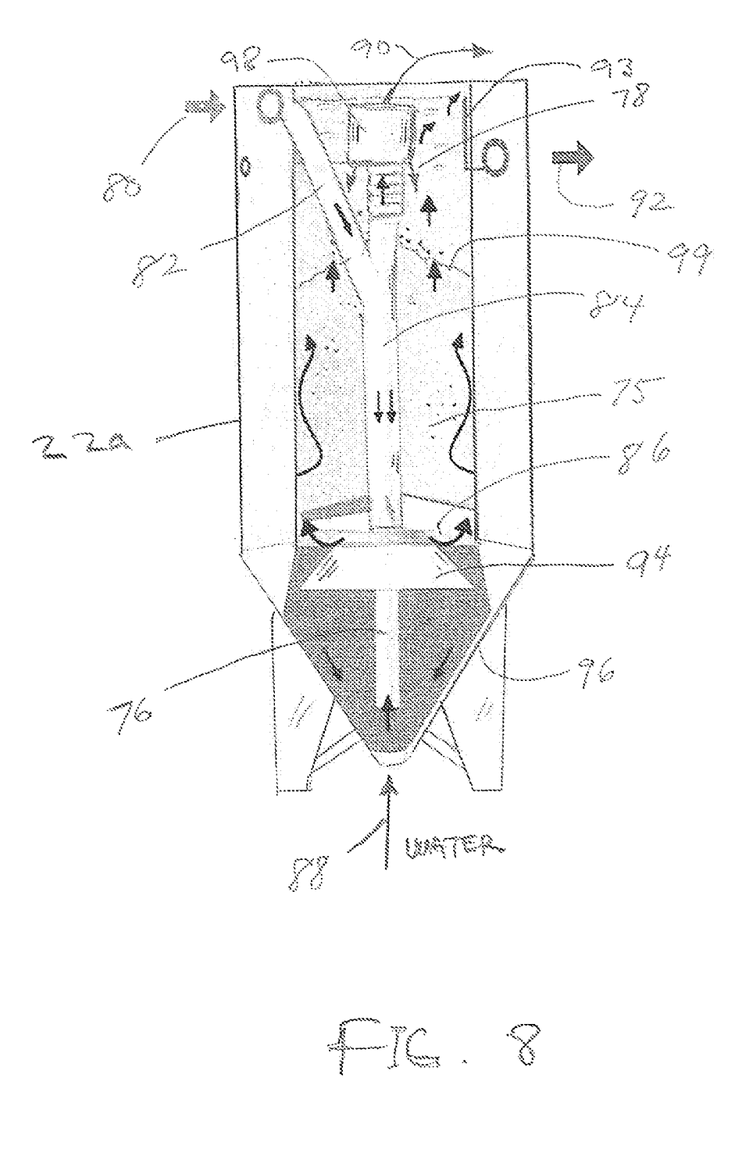
FIG. 8 is a schematic elevation view in section, showing a continuous filtration system as a reactor column.

FIG. 8 shows an alternative to the fluffing cycle and subsystem described above. In lieu of the fluffing cycle shown in FIG. 1 at 42, 34, 36, 38, etc., a DYNASAND type continuous sand filter, i.e. continuously moving medium filter, such as shown in FIG. 8 is employed as the SMI reactor. Thus, in FIG. 1 the fluffing system is eliminated and the SMI reactor is configured as shown at 22a in FIG. 8. DYNASAND filter systems are well known in the filtration industry. Herein that type of system is referred to as a continuously moving medium filtration system. Here, the DYNASAND type continuous medium filter is modified. SMI, indicated at 75, is placed in the upflow column rather than sand. As is well known, a continuously moving medium filter system generally of the type shown in FIG. 8 continually moves the medium within the column, by lifting medium through a central upflow column 76 to be released above, as shown by an arrow at 78, so that medium particles continually move down. In a sand filter, this continuous movement of the sand medium keeps the medium particles loose and open and not compacted. Some of these continuously moving medium filtration systems include a medium cleaner at the upper end of the column 76, but that is not the case with the SMI column 22a. In addition, the column 22a does not use air to lift the medium, but instead uses water.

In FIG. 8, input runoff water (which can be from the point 24 in FIG. 1) enters at 80, flowing down an input conduit 82 and through an outer conduit 84 that is concentric over the medium lift column 76. The water enters the contact bed at a low point at 86, as shown by arrows. A portion of the input water (prior to the inlet at 80) is directed to the bottom inlet of the lifting column 76, as indicated 88. This is a small portion of the influent runoff water; it can be recirculated out the top of the column as indicated at 90, back into the runoff water at an appropriate location, such as downstream of the pH adjusting tank 20 in FIG. 1.

As the water rises through the SMI contact bed 75 and exits the reactor column at 92 via an overflow weir 93, the SMI medium is continuously moving downward, the granules migrating down around a cone 94 and eventually to the bottom of the conical lower end 96 of the reactor column. The input water 88, which can be directed in a narrow jet stream into the upflow conduit 76, draws SMI particles with it and up through the lift column 76. With the water at lower velocity at or near the top end 98 of the uplift column, the particles of medium are dropped out and fall back into the contact bed at the top 99 of the bed. Water flow through the column 76 can be at a low flow rate, such that the SMI bed is fully recirculated over an extended period, such as 8 to 16 hours or more.

In this way, the SMI medium is constantly being moved, with particles tumbling and shuffling relative to one another, maintaining the bed somewhat fluidized, uncompacted and relatively open for promoting reaction of the SMI with selenium or other impurities. The SMI bed is more effective for a longer period of time.

It should be understood that the SMI reactor in the form of a continuously moving medium filtration system can be used in other applications where selenium or other impurities are efficiently removed using SMI. Examples are refinery water, heavy metal-contaminated ground water, water with hexavalent chrome and otherwise contaminated water used in industry or for domestic water.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. A method for removal of contaminants from contaminated water, comprising:
    prefiltering the contaminated water to remove particulate material, if suspended particulate material is present,
    assuring pH of the prefiltered contaminated water is within a range of about pH 5.0 to about pH 7.0, and adjusting pH of the contaminated water when necessary,
    pumping the contaminated water in upflow direction through a reactor column, in a vessel containing a contact bed of SMI which the contaminated water contacts, thereby removing a significant portion of dissolved contaminants from the water, to produce a treated water, and
    the reactor column being a continuously moving medium wherein the medium comprises SMI, with the SMI continuously moving down in the reactor column to a bottom wherein particles of SMI are raised upward with water through an uplift column and then deposited back onto the top of the contact bed, thereby preventing compacting and maintaining looseness in the SMI bed.

2. The method of claim 1, wherein the prefiltering step includes filtering the contaminated water with a sand filter followed by an activated carbon filter.

3. The method of claim 1, wherein the pH of the contaminated water is adjusted to a range of about pH 6.0 to pH 6.5.

4. The method of claim 1, further including adding a biocide into the contaminated water in a concentration effective to reduce biofilm-producing microbes in the contaminated water.

5. The method of claim 1, further including removing from the treated water iron which has been introduced into the water by contact with the SMI.

6. The method of claim 5, wherein the iron removal step includes oxidation of the treated water to oxidize iron and form a precipitate, then a post-filtering step in which iron oxides are filtered out of the water.

7. The method of claim 1, wherein the contaminated water includes selenium, which is removed by the contact bed of SMI.

8. The method of claim 7, wherein the contaminated water is refinery water.

9. The method of claim 1, wherein the contaminated water is heavy metal-contaminated ground water.

10. A system for removing selenium from contaminated water used in industry or for domestic water, comprising:
    a treatment plant receiving a flow of said contaminated water and for removing selenium from the contaminated water,
    the treatment plant including a means for adjusting pH of the contaminated water as necessary to place the acidity of the contaminated water in a range of about pH 5.0 to pH 7.0, and a reactor column downstream of the pH adjustment means and receiving the contaminated water, the reactor column comprising a vessel containing a contact bed of SMI for contact with the contaminated water, and a pump for passing the contaminated water through the reactor column in an upflow direction, the reactor column being effective to remove a significant portion of selenium contained in the contaminated water to produce a treated water, and
    wherein the reactor column is a continuously moving medium wherein the medium comprises SMI, with the SMI moving in a continuous loop down in the reactor column to a bottom wherein particles of SMI are raised upward with water through an uplift column and then deposited back onto the top of the contact bed, thereby preventing compacting and maintaining looseness in the SMI bed.

11. The system of claim 10, wherein said flow of contaminated water comprises refinery water.

12. A system for removing selenium from contaminated water used in industry, comprising:
    a treatment plant receiving a flow of said contaminated water and effective to remove selenium from the contaminated water,
    the treatment plant including a means for adjusting pH of the contaminated water as necessary to place the acidity of the contaminated water in a range of about pH 5.0 to pH 7.0, and a reactor column downstream of the pH adjustment means and receiving the contaminated water,
    the reactor column comprising a continuously moving medium vessel containing a contact bed of SMI as a medium for contact and reaction with the contaminated water, and a pump for passing the contaminated water through the reactor column in an upflow direction, the reactor column being effective to remove a significant portion of selenium contained in the contaminated water to produce a treated water, and the moving medium vessel defining a continuous loop, moving the SMI down by gravity in the reactor column to a bottom wherein particles of SMI simultaneously are raised upward through an uplift column and then deposited back onto the top of the contact bed to thereby prevent compacting and maintain looseness in the SMI bed.

* * * * *